United States Patent
Bontu et al.

(10) Patent No.: US 11,902,957 B2
(45) Date of Patent: Feb. 13, 2024

(54) MULTI-USER COORDINATED TRANSMISSION IN CELLULAR SYSTEMS

(71) Applicant: Telefonaktiebolaget LM Ericsson (publ), Stockholm (SE)

(72) Inventors: Chandra Sekhar Bontu, Nepean (CA); Amr El-Keyi, Kanata (CA); Jagadish Ghimire, Kanata (CA); Hong Ren, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 41 days.

(21) Appl. No.: 17/427,702

(22) PCT Filed: Feb. 13, 2019

(86) PCT No.: PCT/IB2019/051167
§ 371 (c)(1),
(2) Date: Aug. 2, 2021

(87) PCT Pub. No.: WO2020/165630
PCT Pub. Date: Aug. 20, 2020

(65) Prior Publication Data
US 2022/0124731 A1    Apr. 21, 2022

(51) Int. Cl.
*H04W 72/044* (2023.01)
*H04W 72/121* (2023.01)
*H04W 16/28* (2009.01)

(52) U.S. Cl.
CPC ......... *H04W 72/121* (2013.01); *H04W 16/28* (2013.01); *H04W 72/046* (2013.01); *H04W 72/0473* (2013.01)

(58) Field of Classification Search
CPC . H04W 72/121; H04W 16/28; H04W 72/046; H04W 72/0473; H04B 7/0452; H04B 7/0639; H04L 1/0026
See application file for complete search history.

(56) References Cited

U.S. PATENT DOCUMENTS

| 2016/0072562 A1* | 3/2016 | Onggosanusi ....... H04B 7/0478 370/329 |
| 2016/0088648 A1* | 3/2016 | Xue ...................... H04L 1/0026 370/252 |

FOREIGN PATENT DOCUMENTS

| CN | 106233684 A | 12/2016 |
| CN | 108781105 A | 11/2018 |

(Continued)

OTHER PUBLICATIONS

International Search Report and Written Opinion dated Oct. 17, 2019 issued in PCT Application No. PCT/IB2019/051167, consisting of 18 pages.

(Continued)

*Primary Examiner* — Thai Nguyen
(74) *Attorney, Agent, or Firm* — Christopher & Weisberg, P.A.

(57) ABSTRACT

A network node is provided. The network node includes processing circuitry configured to estimate spatial transmission information, STI, for each of a plurality of wireless devices, and determine spatial separability among the plurality of wireless devices based at least in part on the estimated STI for each of the plurality of wireless devices. The processing circuitry is further configured to cause scheduling of the plurality of wireless devices on the same communication resources based at least in part on the determined spatial separability.

29 Claims, 11 Drawing Sheets

(56) References Cited

FOREIGN PATENT DOCUMENTS

| EP | 3406033 B1 * | 4/2021 | ........... H04B 7/0417 |
|----|---|---|---|
| WO | 2015/199942 A1 | 12/2015 | |
| WO | 2017/106868 A1 | 6/2017 | |

OTHER PUBLICATIONS

Chinese Office Action and English translation of the Chinese Office Action dated Nov. 8, 2023 issued in corresponding Chinese Patent Application No. 2 019800918885, consisting of 11 pages.

* cited by examiner

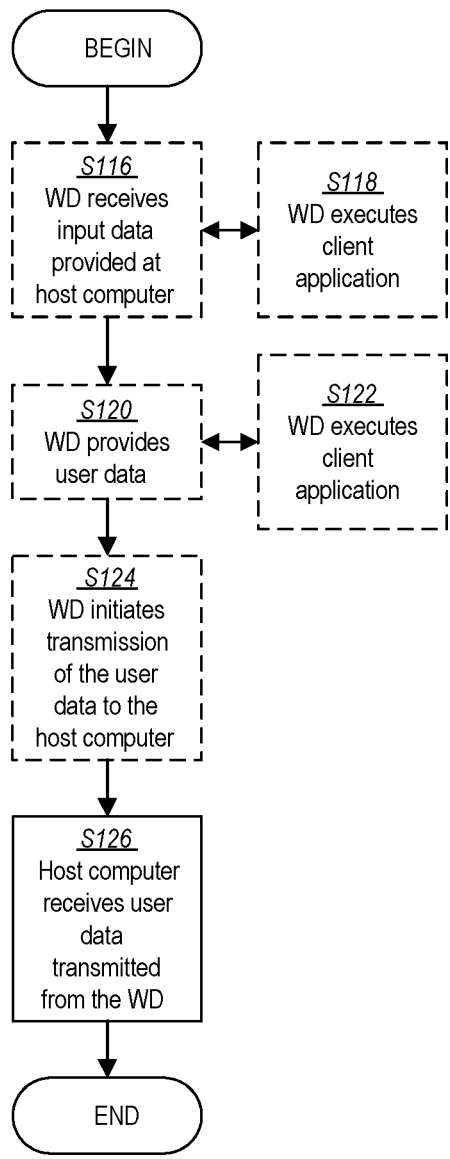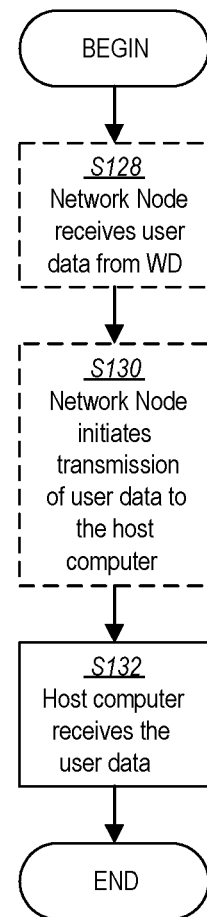
FIG. 5
FIG. 6

MULTI-USER COORDINATED TRANSMISSION IN CELLULAR SYSTEMS

CROSS-REFERENCE TO RELATED APPLICATION

This application is a Submission Under 35 U.S.C. § 371 for U.S. National Stage Patent Application of International Application Number: PCT/IB2019/051167, filed Feb. 13, 2019 entitled "MULTI-USER COORDINATED TRANSMISSION IN CELLULAR SYSTEMS," the entirety of which is incorporated herein by reference.

TECHNICAL FIELD

Wireless communication and in particular, coordinated communications based at least in part on estimated spatial transmission information.

BACKGROUND

In next generation cellular systems, such as Long Term Evolution (LTE)-Advanced and New Radio (NR) (NR is also referred to as "5G"), the specifications are defined to support Advanced or Adaptive Antenna Systems (AAS) in the network. In cellular systems equipped with AAS, the available radio resources can be efficiently reused or reallocated to different wireless devices. For example, transmissions towards different sets of wireless devices can be performed simultaneously on the same radio resource by appropriately precoding the transmissions such that there is insignificant interference between the transmissions that are directed towards different wireless devices. Appropriate precoding or prefiltering of the transmissions is one factor that provides a capacity increase, or else such simultaneous transmissions can result in the opposite effect, i.e., degraded network capacity.

The wireless devices that can be paired together for simultaneous transmission depend on the AAS configuration and the deployment scenario. Since individual transmissions in modern wireless system exploit the Multiple-Input Multiple-Output (MIMO) processing, the technology of supporting simultaneous transmissions whereby each transmission (towards a wireless device) is a MIMO transmission is commonly referred to as Multiuser MIMO (MU-MIMO). The algorithms for deciding which transmissions can occur simultaneously are called the "MU-MIMO pairing algorithms".

For one such MU-MIMO paring algorithm in non-AAS systems, a spatial channel orthogonality check between the instantaneous channels of different wireless devices may be performed before pairing the wireless devices for simultaneous transmission on the same radio resources. The computation of the orthogonality measure between different combinations of connected wireless devices can cause a substantial computational burden, particularly in future cellular system where many connected wireless devices are expected to be served. Note that the complexity of such mutual orthogonality check grows exponentially with the number of wireless devices, which means, this approach may become impractical when the number of wireless devices being served is not small. Therefore, even though one possible goal may be to use MU-MIMO as much as possible, existing systems may have limitation on such use.

SUMMARY

Some embodiments advantageously provide a method, system, network node and wireless device for coordinated communications based at least in part on estimated spatial transmission information.

According to one or more embodiments, multiple network nodes estimate a spatial transmission information (STI) from the uplink (UL), i.e., from wireless device to network node reception from a pool of wireless devices at a group of antenna elements of each network node, and/or from UL feedback, e.g., PMI. The wireless devices in the pool of wireless devices may be in communication with at least one of the network nodes as their anchor node. A central network node assesses the STIs from all the network nodes for spatial separability among the wireless devices' transmissions.

In some embodiments, the central network node provides a recommendation to the network nodes to schedule simultaneous transmissions towards the wireless devices that are spatially separable by precoding the transmission from the network nodes on the STI measured radio resources.

According to one embodiment, the STI is an angle of arrival (AoA). According to another embodiment, the STI is a set of power measurements of the received signals from AAS projected onto a bank or group of spatial orthonormal functions.

The central network node helps each network node in measuring the STI by supplying the relevant signal configurations of the UL transmissions from wireless devices within the wireless device pool/group. The functionality of the central network node may reside in one of the network nodes or a separate network entity or a higher network layer entity such as MME/SGW.

According to one aspect of the disclosure, a network node is provided. The network node includes processing circuitry configured to estimate spatial transmission information, STI, for each of a plurality of wireless devices, and determine spatial separability among the plurality of wireless devices based at least in part on the estimated STI for each of the plurality of wireless devices. The processing circuitry is further configured to cause scheduling of the plurality of wireless devices on the same communication resources based at least in part on the determined spatial separability.

According to one or more embodiments of this aspect, the STI corresponds to an angle of arrival, AoA with respect to the connected network node. According to one or more embodiments of this aspect, the STI corresponds to a power spectrum of an estimated channel for each wireless device. According to one or more embodiments of this aspect, estimating of STI includes: logically projecting received signals onto a set of spatial orthonormal function, measuring powers of each spatial orthonormal function, and selecting an angle of arrival, AoA corresponding to a lowest Euclidean distance between the measured powers and expected powers.

According to one or more embodiments of this aspect, estimating of STI includes: filtering received signals using a set of spatial orthonormal functions, measuring powers of each of the filtered signals, comparing the measured powers with expected powers for an azimuth and elevation, and determining whether the azimuth and elevation an angle of arrivals, AoAs, correspond to the expected powers at a minimum Euclidean distance. According to one or more embodiments of this aspect, the set of spatial orthonormal functions includes a set of functions that are orthogonal to each other in a plurality of spatial dimensions where the plurality of spatial dimensions includes at least one of distance, elevation and azimuth defined with respect to the location of a network node.

According to one or more embodiments of this aspect, the determining of spatial separability includes: reducing power spectrum components of the power spectrum of the estimated channel by selecting a subset of power spectrum components, and determining a spectrum overlap between the plurality of wireless devices based at least in part on the reduced power spectrum components. According to one or more embodiments of this aspect, the network node includes transmitter and receiver functions towards a wireless device.

According to one or more embodiments of this aspect, the determining of the spatial separability includes: selecting a wireless device, comparing STI of the selected wireless device with STI of another wireless device, and including both the wireless devices in a multiuser, MU, group if the comparison meets a criterion. According to one or more embodiments of this aspect, the determining of spatial separability includes: selecting a wireless device, comparing STI of the selected wireless device with STIs of wireless devices in a multiuser, MU, group, and including the wireless device in the MU group if the comparison passes a criterion. According to one or more embodiments of this aspect, the comparing of STI includes at least one of: computing a Euclidean distance between the STIs of any two wireless devices, and computing a correlation between the STIs of any two wireless devices. According to one or more embodiments of this aspect, the computing of the correlation includes computing the Euclidean distance between the any two STIs and subtracting sum of squares of each STI.

According to one or more embodiments of this aspect, the criterion defines at least one rule configured to check if the comparison is one of: above a predetermined threshold, and below a predetermined threshold. According to one or more embodiments of this aspect, the scheduling corresponds to pairing the plurality of wireless devices for multi-user multiple-input multiple-output, MU-MIMO, pairing. According to one or more embodiments of this aspect, the plurality of wireless devices are serviced by a plurality of network nodes. According to one or more embodiments of this aspect, the scheduling of the plurality of wireless devices on the same communication resources includes causing each of the plurality of network nodes to precode transmission on the same communication resources.

According to another aspect of the disclosure, a method performed by a network node is provided. Spatial transmission information, STI, for each of a plurality of wireless devices is estimated. Spatial separability among the plurality of wireless devices is determined based at least in part on the estimated STI for each of the plurality of wireless devices. Scheduling of the plurality of wireless devices on the same communication resources is caused based at least in part on the determined spatial separability.

According to one or more embodiments of this aspect, the STI corresponds to an angle of arrival, AoA with respect to the connected network node. According to one or more embodiments of this aspect, the STI corresponds to a power spectrum of an estimated channel for each wireless device. According to one or more embodiments of this aspect, the estimating of STI includes: logically projecting received signals onto a set of spatial orthonormal functions, measuring powers of each spatial orthonormal function, and selecting an angle of arrival, AoA corresponding to a lowest Euclidean distance between the measured powers and expected powers.

According to one or more embodiments of this aspect, the estimating of STI includes: filtering received signals using a set of spatial orthonormal functions, measuring powers of each of the filtered signals, comparing the measured powers with expected powers for an azimuth and elevation, and determining whether the azimuth and elevation an angle of arrivals, AoAs, correspond to the expected powers at a minimum Euclidean distance. According to one or more embodiments of this aspect, the set of spatial orthonormal functions include a set of functions that are orthogonal to each other in a plurality of spatial dimensions, the plurality of spatial dimensions including at least one of distance, elevation and azimuth defined with respect to the location of a network node.

According to one or more embodiments of this aspect, the determining of spatial separability includes: reducing power spectrum components of the power spectrum of the estimated channel by selecting a subset of power spectrum components, and determining a spectrum overlap between the plurality of wireless devices based at least in part on the reduced power spectrum components. According to one or more embodiments of this aspect, the network node includes transmitter and receiver functions towards a wireless device. According to one or more embodiments of this aspect, the determining of spatial separability includes: selecting a wireless device, comparing STI of the selected wireless device with STI of another wireless device, and including both the wireless devices in a multiuser, MU, group if the comparison meets a criterion.

According to one or more embodiments of this aspect, the determining of spatial separability includes: selecting a wireless device, comparing STI of the selected wireless device with STIs of wireless devices in a multiuser, MU, group, and including the wireless device in the MU group if the comparison passes a criterion. According to one or more embodiments of this aspect, the comparing of STI includes at least one of: computing a Euclidean distance between the STIs of any two wireless devices, and computing a correlation between the STIs of any two wireless devices. According to one or more embodiments, the computing of the correlation includes computing the Euclidean distance between the any two STIs and subtracting sum of squares of each STI. According to one or more embodiments of this aspect, the criterion defines at least one rule configured to check if the comparison is one of: above a predetermined threshold, and below a predetermined threshold.

According to one or more embodiments of this aspect, the scheduling corresponds to pairing the plurality of wireless devices for multi-user multiple-input multiple-output, MU-MIMO, pairing. According to one or more embodiments of this aspect, the plurality of wireless devices are serviced by a plurality of network nodes. According to one or more embodiments of this aspect, the scheduling of the plurality of wireless devices on the same communication resources includes causing each of the plurality of network nodes to precode transmission on the same communication resources.

According to another aspect of the disclosure, a network node is provided. The network node includes processing circuitry configured to estimate spatial transmission information, STI, for each of a plurality of wireless devices based at least in part on uplink reception from each of the plurality of wireless devices where the estimated STI corresponding to an angle of arrival, AoA, with respect to a connected network node. The processing circuitry is further configured to determine spatial separability among the plurality of wireless devices based at least in part on the estimated STI for each of the plurality of wireless devices. The processing circuitry is further configured to cause scheduling of the plurality of wireless devices on the same communication resources for multiuser multiple-input multiple-output, MU-MIMO, based at least in part on the determined spatial separability.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating exemplary methods implemented in a communication system including a host computer, a network node and a wireless device for receiving user data from the wireless device at a host computer according to some embodiments of the present disclosure;

FIG. 6 is a flowchart illustrating exemplary methods implemented in a communication system including a host computer, a network node and a wireless device for receiving user data at a host computer according to some embodiments of the present disclosure;

DETAILED DESCRIPTION

Figure 1:
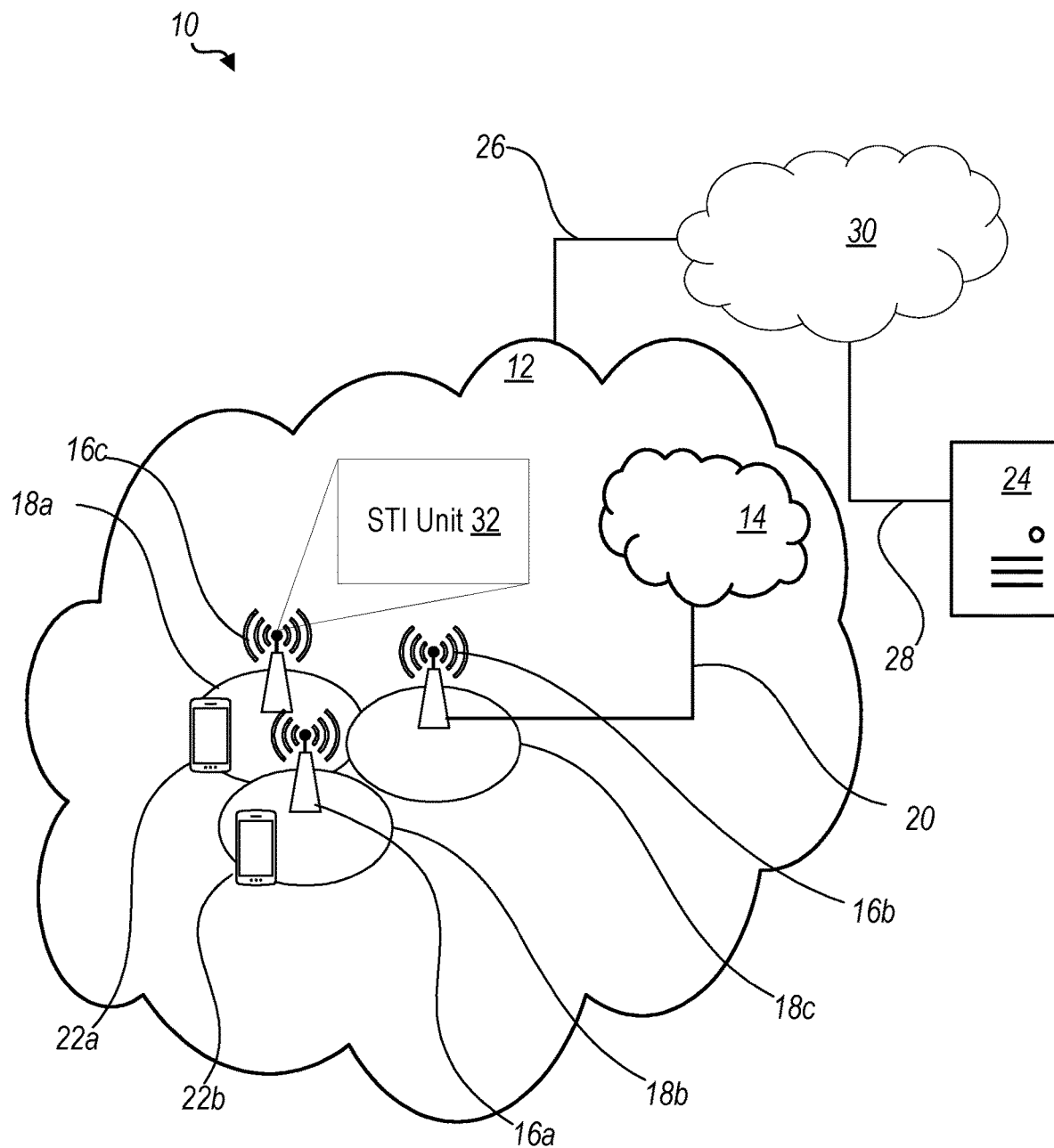
FIG. 1 is a schematic diagram of an exemplary network architecture illustrating a communication system connected via an intermediate network to a host computer according to the principles in the present disclosure.

Simultaneous transmission is advantageous when the transmissions towards each wireless device causes minimal/ recoverable interference do not interfere with the transmissions towards other wireless devices. It is possible to transmit signals simultaneously when the transmission channels transmitted to paired wireless devices are orthogonal or close to orthogonal, such that a measure of a desired network utility such as sum capacity of the simultaneous transmission, for example, is still higher than the single transmission towards one wireless device. This disclosure provides a selection and pairing mechanism for simultaneous transmissions in a MU-MIMO system.

Further, the present disclosure helps solve at least some of the problem(s) with existing systems by estimating spatial transmission information (STI) and causing scheduling based at least in part on the STI as described herein. This allows for the computational complexity of multiuser (MU)-MIMO pairing algorithms to be reduced by exploiting the channel characteristics of system equipped with AAS.

Before describing in detail exemplary embodiments, it is noted that the embodiments reside primarily in combinations of apparatus components and processing steps related to coordinated communications based at least in part on estimated spatial transmission information. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node and/or network entity comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), central network node, etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

The term resource used herein may correspond to any type of physical resource or radio resource expressed in terms of length of time and/or frequency. Signals are transmitted or received by a radio node over a time resource. Examples of time resources are: symbol, time slot, subframe, radio frame, Transmission Time Interval (TTI), interleaving time, etc.

An indication generally may explicitly and/or implicitly indicate the information it represents and/or indicates. The implicit indication may for example be based on position and/or resource used for transmission. The explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A channel may generally be a logical, transport or physical channel. A channel may comprise and/or be arranged on one or more carriers, in particular, a plurality of subcarriers. A channel carrying and/or for carrying control signaling/control information may be considered a control channel, in particular, if it is a physical layer channel and/or if it carries control plane information. Analogously, a channel carrying and/or for carrying data signaling/user information may be considered a data channel, in particular, if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

The term signal used herein can be any physical signal or physical channel. Examples of downlink physical signals are reference signal such as Primary Synchronization Signal (PSS), Secondary Synchronization Signal (SSS), Cell Specific Reference Signal (CRS), Positioning Reference Signal (PRS), Channel State Information Reference Signal (CSI-RS), Demodulation Reference Signal (DMRS), Narrowband Reference Signal (NRS), Narrowband Primary Synchronization Signal (NPSS), Narrowband Secondary Synchronization Signal (NSSS), Synchronization Signals (SS), Multimedia Broadcast Single Frequency Reference Signal (MBSFN RS) etc. Examples of uplink physical signals are reference signal such as Sounding Reference Signal (SRS), DMRS, etc. The term physical channel (e.g., in the context of channel reception) used herein is also called as 'channel. The physical channel carries higher layer information (e.g. radio resource control (RRC), logical control channel, etc.). Examples of downlink physical channels are Physical Broadcast Channel (PBCH), Narrowband Physical Broadcast Channel (NPBCH), Physical Downlink Control Channel (PDCCH), Physical Downlink Shared Channel (PDSCH), short Physical Downlink Shared Channel (sPDSCH), Machine Type Communication (MTC) physical downlink control channel (MPDCCH), Narrowband Physical Downlink Control Channel (NPDCCH), Narrow Physical Downlink Shared Channel (NPDSCH), Enhanced Physical Downlink Control Channel (E-PDCCH), etc. Examples of uplink physical channels are shorten Physical Uplink Control Channel (sPUCCH). shorten Physical Uplink Shared Channel (sPUSCH), Physical Uplink Shared Channel (PUSCH), Physical Uplink Control Channel (PUCCH), Narrowband Physical Uplink Shared Channel (NPUSCH), Physical Random Access Channel (PRACH), Narrowband Physical Random Access Channel (NPRACH), etc.

Generally, configuring may include determining configuration data representing the configuration and providing, e.g., transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or downlink control information (DCI) and/or uplink control or data or communication signaling, in particular acknowledgement signaling, and/or configuring resources and/or a resource pool therefor.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, Third Generation Partnership Project (3GPP, a standardization organization) LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide coordinated communications based at least in part on estimated spatial transmission information.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network node 16), such as NBs, eNBs, gNBs, network entities or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB (i.e., type of network node 16) for LTE/E-UTRAN and a gNB (i.e., another type of network node 16) for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a STI unit 32 which is configured to at least estimate and use spatial transmission information, for example.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to process, receive, transmit, forward, determine, communicate, etc., information related to STI and/or spatial separability and/or scheduling.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more radio frequency (RF) transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

In one or more embodiments, the hardware 58 may including one or more antenna elements 71 for transmitting and/or receiving wireless signals. In one or more embodiments, the antenna elements 71 may correspond to an M×N subarray of antennas and/or antenna elements 71. In one or more embodiments, the M×N subarray of antennas and/or antenna elements 71 may support and/or provide Advanced or Adaptive Antenna Systems (AAS) functionality. In one or more embodiments, each antenna element 71 may have a corresponding antenna port.

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include STI unit 32 configured to determine and use spatial transmission information as described herein.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. In one or more embodiments, WD 22 includes a unit (not shown) that is configured to cause references signals to be transmitted and/or CSI feedback to be reported, both of which are known in the art.

Figure 2:
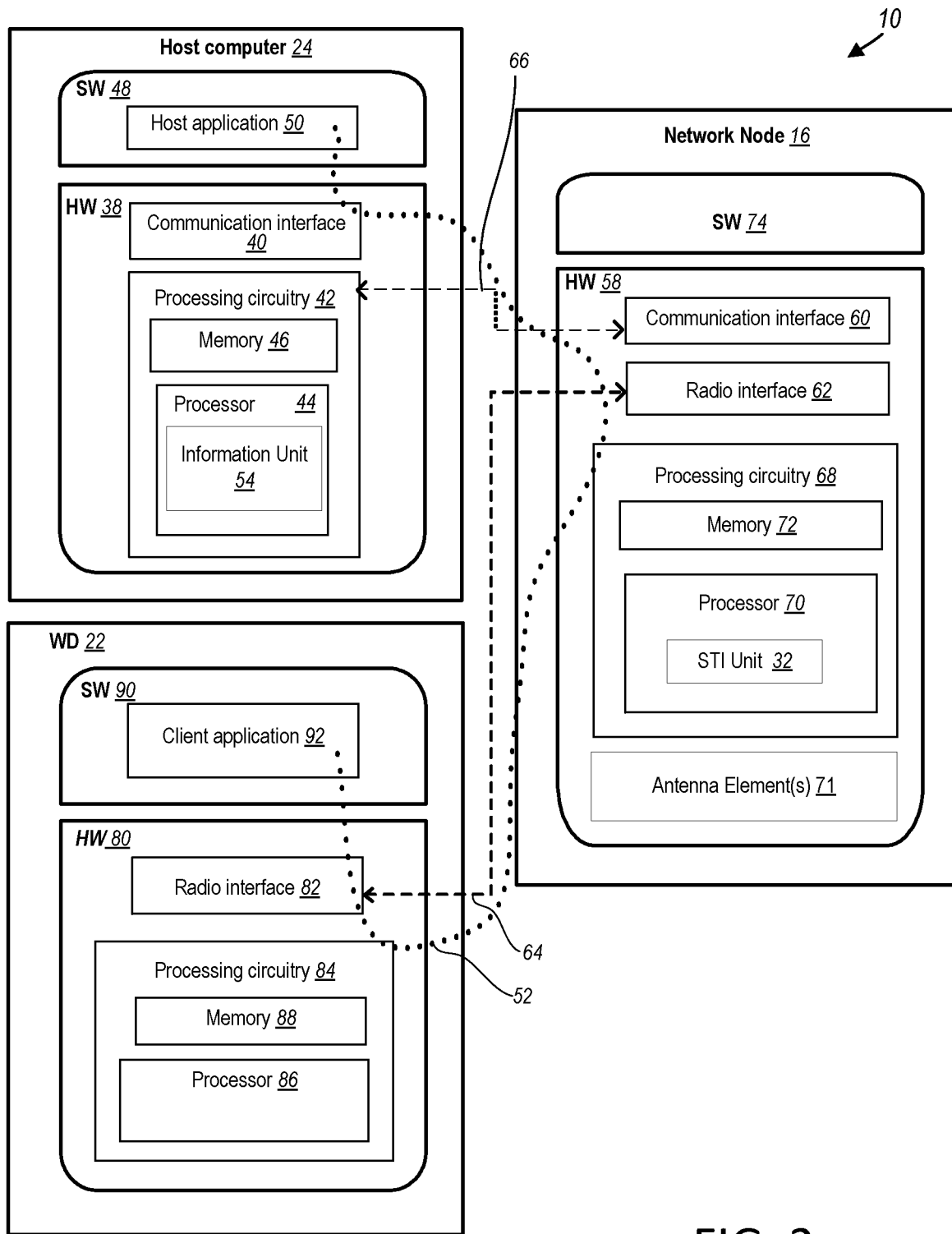
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced wireless device 22 waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as STI unit 32, and information unit 54 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
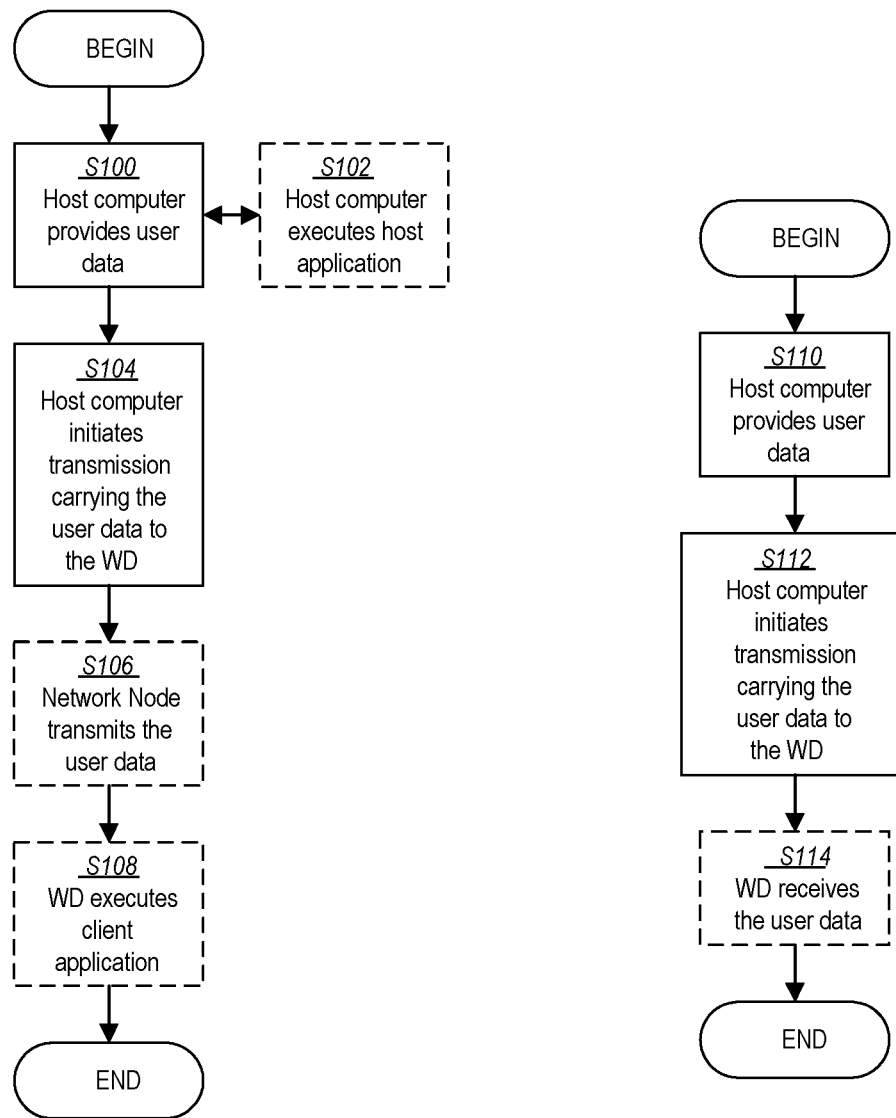
FIG. 3 is a flowchart illustrating exemplary methods implemented in a communication system including a host computer, a network node and a wireless device for executing a client application at a wireless device according to some embodiments of the present disclosure.
FIG. 4 is a flowchart illustrating exemplary methods implemented in a communication system including a host computer, a network node and a wireless device for receiving user data at a wireless device according to some embodiments of the present disclosure.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
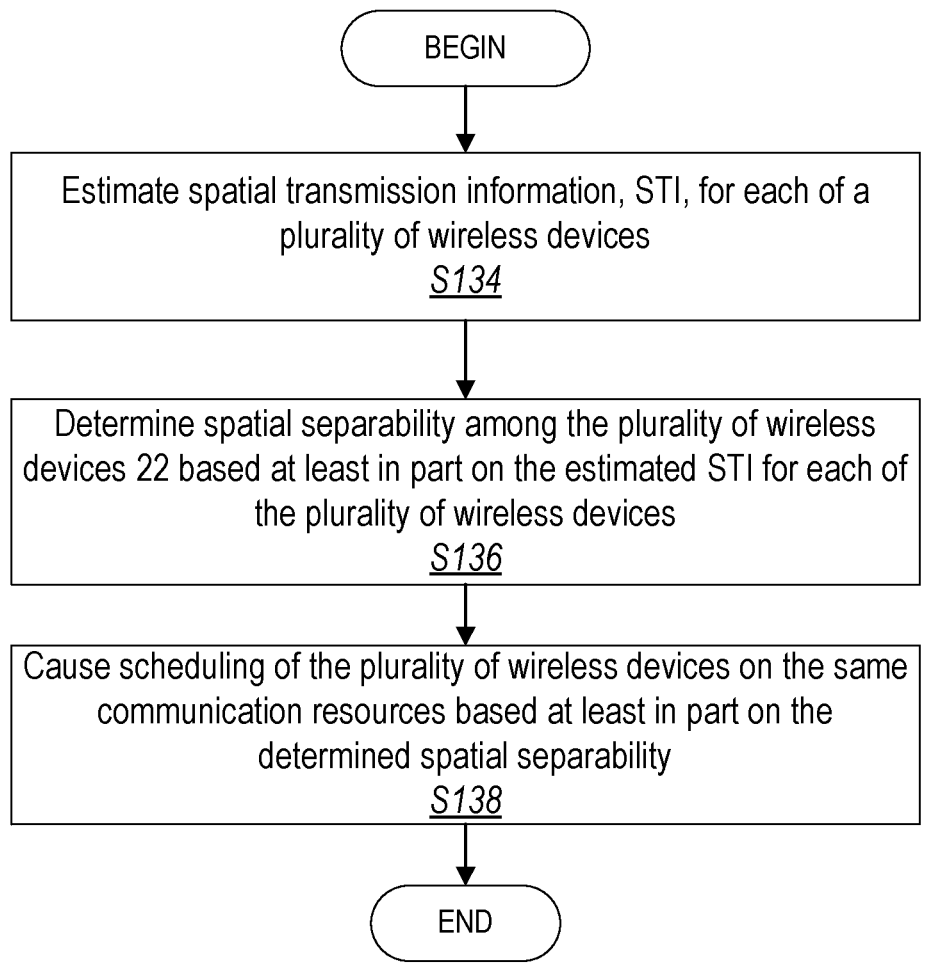
FIG. 7 is a flowchart of an exemplary process in a network node according to some embodiments of the present disclosure.

FIG. 7 is a flowchart of an exemplary process in a network node 16 according to some embodiments of the disclosure. One or more Blocks and/or functions performed by network node 16 may be performed by one or more elements of network node 16 such as by STI unit 32 in processing circuitry 68, processor 70, radio interface 62, etc. In one or more embodiments, network node 16 such as via one or more of processing circuitry 68, processor 70 and radio interface 62 is configured to estimate (Block S134) spatial transmission information, STI, for each of a plurality of wireless devices 22, as described herein. In one or more embodiments, network node 16 such as via one or more of processing circuitry 68, processor 70 and radio interface 62 is configured to determine (Block S136) spatial separability among the plurality of wireless devices 22 based at least in part on the estimated STI for each of the plurality of wireless devices 22, as described herein. In one or more embodiments, network node 16 such as via one or more of processing circuitry 68, processor 70 and radio interface 62 is configured to cause (Block S138) scheduling of the plurality of wireless devices 22 on the same communication resources, i.e., radio resources, based at least in part on the determined spatial separability, as described herein.

According to one or more embodiments, the STI corresponds to an angle of arrival, AoA with respect to connected network node 16. According to one or more embodiments, the estimating of STI includes: logically projecting received signals onto a set of spatial orthonormal functions, measuring powers of each spatial orthonormal function, and selecting an angle of arrival, AoA corresponding to a lowest Euclidean distance between the measured powers and expected powers. According to one or more embodiments, the estimating of STI includes: filtering received signals using a set of spatial orthonormal functions, measuring powers of each of the filtered signals, comparing the measured powers with expected powers for an azimuth and elevation, and determining whether the azimuth and elevation an angle of arrivals, AoAs, correspond to the expected powers at a minimum Euclidean distance.

According to one or more embodiments, the set of spatial orthonormal functions include a set of functions that are orthogonal to each other in a plurality of spatial dimensions where the plurality of spatial dimensions includes at least one of distance, elevation and azimuth defined with respect to the location of a network node 16. According to one or more embodiments, the determining of spatial separability includes: reducing power spectrum components of the power spectrum of the estimated channel by selecting a subset of power spectrum components, and determining a spectrum overlap between the plurality of wireless devices 22 based at least in part on the reduced power spectrum components. According to one or more embodiments, the network node 16 includes transmitter and receiver functions towards a wireless device 22. According to one or more embodiments, the STI corresponds to a power spectrum of an estimated channel for each wireless device 22.

According to one or more embodiments, the determining of the spatial separability includes: selecting a wireless device 22, comparing STI of the selected wireless device 22 with STI of another wireless device 22, and including both the wireless devices 22 in a multiuser, MU, group if the comparison meets a criterion. According to one or more embodiments, the determining of the spatial separability includes selecting a wireless device 22, comparing STI of the selected wireless device 22 with STIs of wireless devices in a multiuser (MU) group, and including the wireless device 22 in the MU group if the comparison passes a criterion. According to one or more embodiments, the comparing of the STI includes at least one of: computing a Euclidean distance between the STIs of any two wireless devices 22, and computing a correlation between the STIs of any two wireless devices 22. According to one or more embodiments, the computing of the correlation includes computing the Euclidean distance between the any two STIs and subtracting sum of squares of each STI.

According to one or more embodiments, the criterion defines at least one rule configured to check if the comparison is one of: above a predetermined threshold, and below a predetermined threshold. According to one or more embodiments, the scheduling corresponds to pairing the plurality of wireless devices 22 for multi-user multiple-input multiple-output, MU-MIMO, pairing. According to one or more embodiments, the plurality of wireless devices 22 are serviced by a plurality of network nodes 16. According to one or more embodiments, the scheduling of the plurality of wireless devices 22 on the same communication resources includes causing each of the plurality of network nodes 16 to precode transmission on the same communication resources.

Having generally described arrangements for estimating STI and optionally scheduling wireless devices 22 on the same radio resources based at least in part on the estimated STI, details for these arrangements, functions and processes are provided as follows, and which may be implemented by the network node 16, wireless device 22 and/or host computer 24. In one or more embodiments, the scheduling and/or causing of the scheduling of two or more wireless devices 22 at the same time on the same radio resources (or at least one overlapping radio resource) is part of coordinated transmission, MU-MIMO pairing of wireless devices 22, MU grouping, etc., as described herein.

In cellular systems equipped with Advanced (or Adaptive or Array) Antenna Systems (AAS), the available radio resources can be efficiently reused or reallocated to different wireless devices 22 based on the relative spatial separation between different wireless devices 22. When wireless devices 22 are spatially separable within the AAS capability, the network node 16 can transmit data to these wireless devices 22 on the same radio resource simultaneously.

Figure 8:
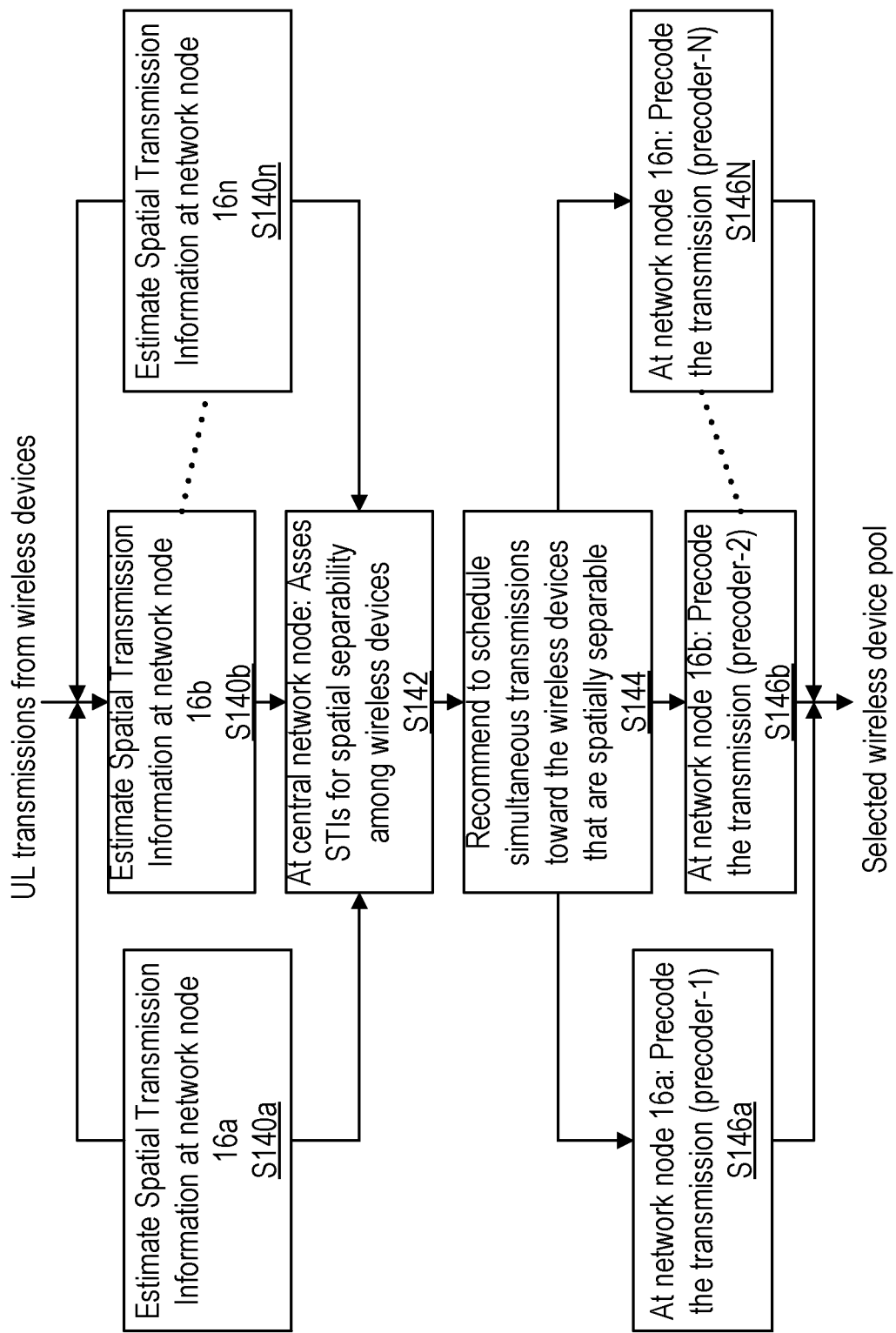
FIG. 8 is a flowchart of an exemplary process for coordinated transmission using spatial transmission information in accordance with some embodiments of the disclosure.

FIG. 8 is flow diagram of a process for coordinated transmission based at least in part on estimated spatial transmission information. According to one or more embodiments, multiple network networks 16 estimate (Block S140a-S140n), such as via one or more of processing circuitry 68 and processor 70, spatial transmission information (STI) from the UL reception from a pool (i.e., group) of wireless devices 22 at a group of antenna elements of each network node 16. In one or more embodiments, wireless device 22 "pool" and/or pool of wireless devices 22 may refer to at least a subset of connected wireless devices 22 based on one or more characteristics such as voice over IP service or other service. The wireless devices 22 in the wireless device 22 pool may be connected to at least one of the network nodes 16 as their anchor node. In one or more embodiments, network node 16 such as via one or more of processing circuitry 68, processor 70 and radio interface 62 is configured to assesses (Block S142) the STIs from the network nodes 16a-16n for spatial separability among the wireless devices 22's transmissions. In one or more embodiments, one of the network nodes 16a-16n is the central network node that is performing one or more functions described herein.

In one or more embodiments, network node 16, such as via one or more of processing circuitry 68, processor 70 and radio interface 62 is configured to recommend (Block S144) to one or more network nodes 16 to schedule simultaneous transmissions towards the wireless devices 22 that are spatially separable by precoding the transmission from the one or more network nodes 16 on the STI measured radio resources. This means, in one or more embodiments, these wireless devices 22 are scheduled on the same radio resources. In one or more embodiments, network nodes 16a-16n such as via one or more of processing circuitry 68, processor 70 and radio interface 62 is configured to precode (Block S146a-146n) the respective transmissions with respective precoders where precoder 1-N may be different from each other.

In one or more embodiments, the STI is an angle of arrival (AoA) such as with respect to a connected network node 16 or network node to which wireless device 22 is connected to. In one or more embodiments, the STI is a set of power measurements of the received signals from AAS projected onto a bank of spatial orthonormal functions. The network node 16, i.e., central network node 16, may help each network node 16 in measuring the STI by the network nodes 16 by supplying the relevant signal configurations of the UL transmissions from wireless devices 22 within the wireless device 22 pool. In one or more embodiments, the functionality of the central network node 16 may reside in one of the network nodes 16 and/or a separate network node 16 and/or a higher network layer entity such as Mobility Management Entity (MME)/Serving Gateway (SGW).

Figure 9:
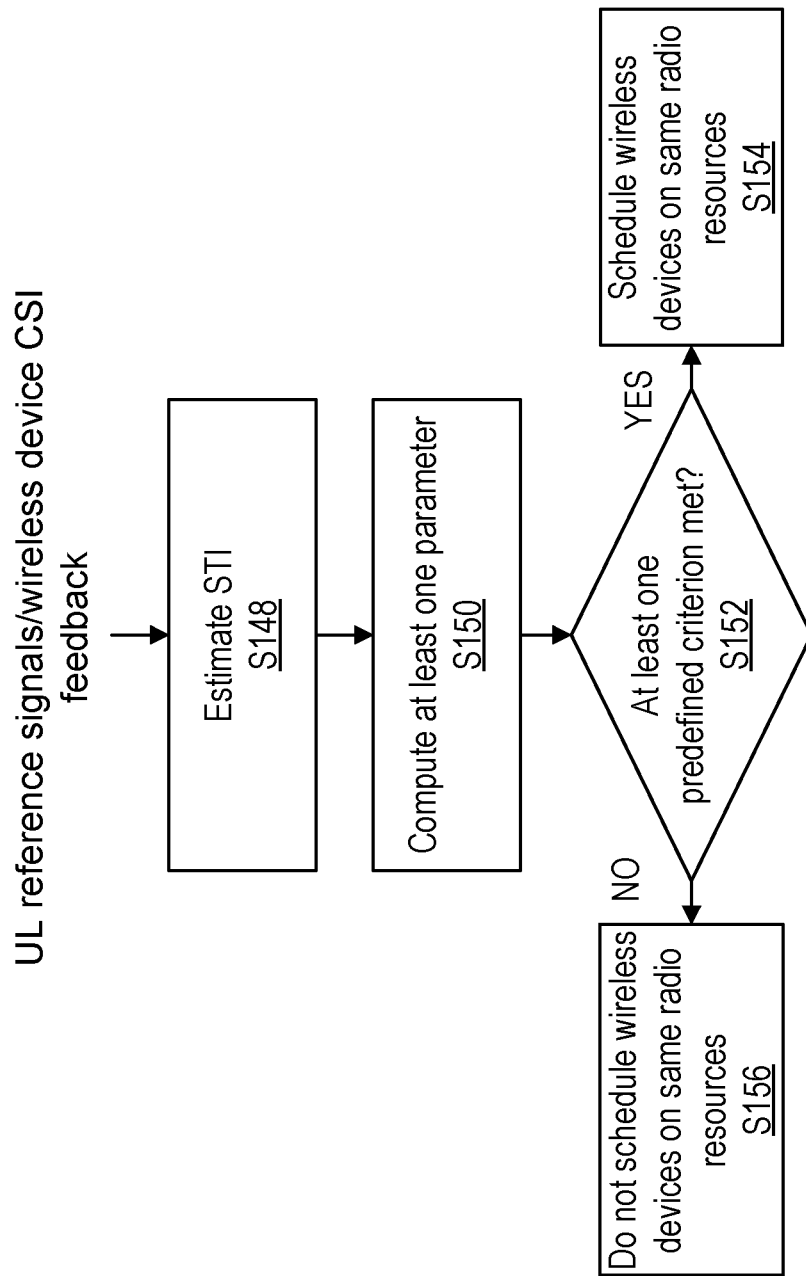
FIG. 9 is a flowchart an exemplary process for providing coordinated transmission for at least two wireless devices in accordance with some embodiments of the disclosure.

FIG. 9 is a flow diagram one process for determining whether to schedule two or more wireless devices 22 on the same one or more radio resources. In one or more embodiments, two or more wireless devices 22 scheduled on the same one or more radio resources at the same time may be referred to as a multiuser group. In one or more embodiments, the scheduling of two or more wireless devices 22 on the same one or more radio resources may correspond to pairing the wireless devices 22 for MU-MIMO pairing. In one or more embodiments, network node 16 such as via one or more of processing circuitry 68, processor 70 and radio interface 62 is configured to estimate (Block S148) STI. For example, in one or more embodiments, a measure of spatial transmission information (STI) of two different wireless devices 22, e.g., WD 22-$k$ and WD 22-$j$, $j \neq k$ is estimated from the received signal from the wireless device 22, WD 22-$k$ and WD 22-$j$ respectively (i.e., UL reference signals and/or wireless devices 22 channel state information (CSI) feedback from AAS such as an M×N subarrays). In one or more embodiments, the STI may corresponds to an angle of arrival (AoA). The measured STI for WDs 22 $k$ and $j$ can be respectively represented as $A_k^{t,f}$ and $A_j^{t,f}$ at time and frequency $f$.

In one or more embodiments, network node 16 such as via one or more of processing circuitry 68, processor 70 and radio interface 62 is configured to compute (Block S150) at least one parameter. For example, in one or more embodiments, the network node 16 computes parameter $f(A_k^{t,f}, A_j^{t,f})$. In one or more embodiments, the at least one parameter is computed according to $A_j^{t,f} \neq k$. In one or more embodiments, the network node 16 such as via one or more of processing circuitry 68, processor 70 and radio interface 62 is configured to determine (Block S152) whether at least one predefined criterion is satisfied. For example, in one or more embodiments, a predefined criterion is satisfied if the parameter (c) is equal to 1 (e.g., threshold), as described below. In one or more embodiments, the at least one predefined criterion being met indicates that the wireless devices 22 are spatially separable. In one or more embodiments, the predefined criterion may be based on at least one of a Euclidean distance between the STIs of any two wireless devices 22 and a computed correlation between the STIs of any two wireless devices 22. The Euclidean distance between two STIs may be denoted by: <STI_i, STI_j> where <x,y> denotes an inner product operation defined on the field of the STI. In one or more embodiments, the computing of the correlation includes computing the Euclidean distance between the two STIs and subtracting sum of squares of each STI. As used herein, in one or more embodiments, the at least one predefined criterion may define at least one rule.

In one or more embodiments, when the STI of the two wireless devices 22 satisfy a predefined criterion based at least in part on determination of parameter $f(A_k^{t,f}, A_j^{t,f})$, the network node 16 such as via one or more of processing circuitry 68, processor 70 and radio interface 62 is configured to schedule (or cause scheduling) (block S154) the two wireless device 22 (e.g., plurality of wireless devices 22) on the same downlink (DL) radio resource. For example, the predefined criterion may define min, max and/or threshold Euclidean distance that should be met and/or a min, max and/or threshold correlation between the STIs of any two wireless devices 22 that should be met. In one or more embodiments, if the at least one predefined criterion is not satisfied (i.e., c does not equal to 1, for example), the network node 16 such as via one or more of processing circuitry 68, processor 70 and radio interface 62 is configured to not schedule, i.e., omit scheduling of, (Block S156) the two wireless devices 22 (i.e., WD 22-$k$ and WD 22-$i$) on the same radio resources (t, f). In one or more embodiments, the parameter is s function $f(x,y)$ where the at least one predefined criterion can be expressed as follows:

$$f(x, y) = \begin{cases} 1 & \text{when } x \text{ and } y \text{ are spatially separable} \\ 0 & \text{otherwise} \end{cases}$$

That is, when the two wireless devices 22's STI indicates that the wireless devices 22 transmissions are spatially separated enough (i.e., spatial separation meets at least one predefined criterion) for the DL transmission from the AAS be optimized such that the DL transmission towards WD 22-$k$ is nulled towards WD 22-$j$ and vice versa.

Figure 10:
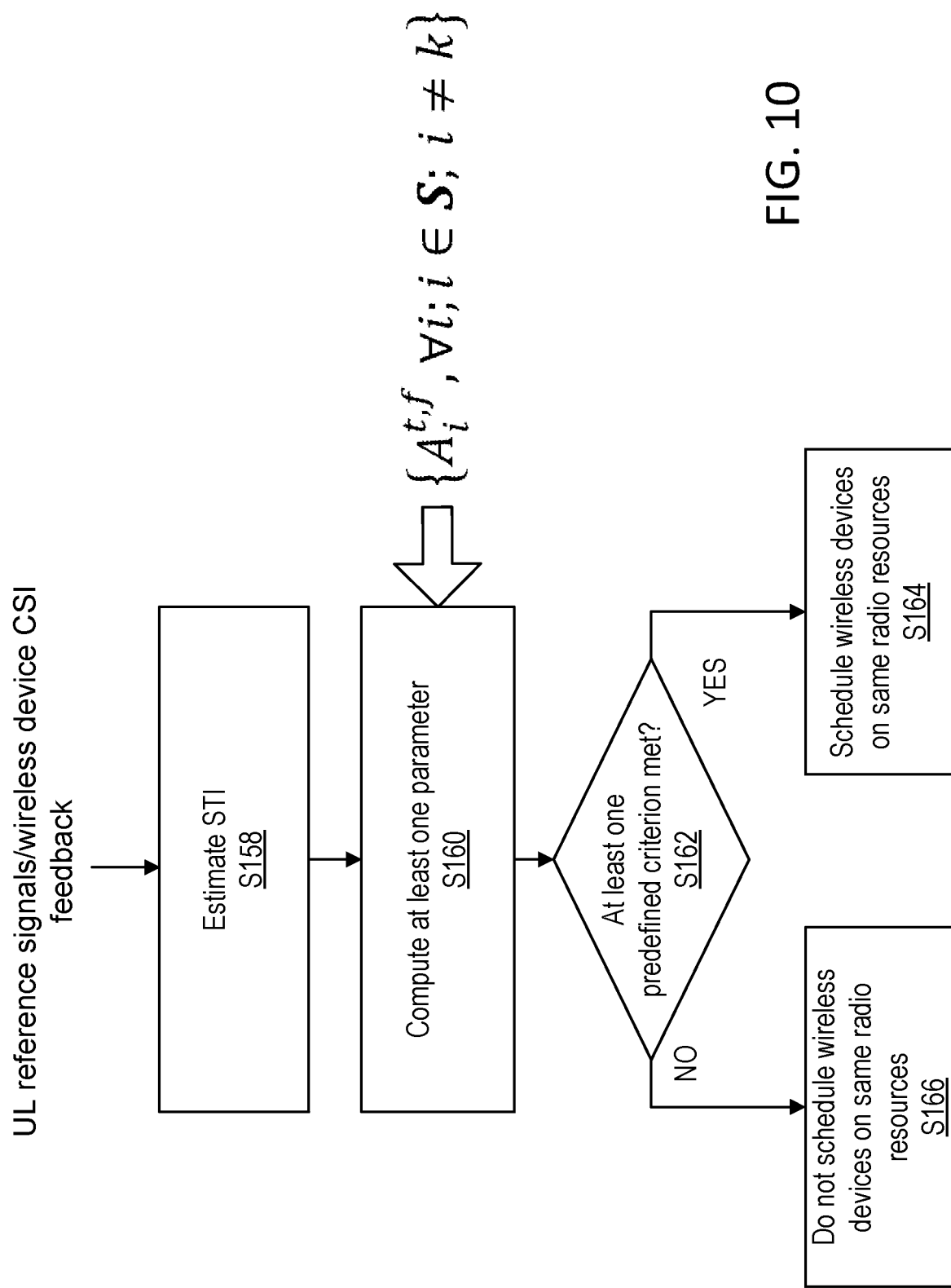
FIG. 10 is a flowchart of another exemplary process for providing coordinated transmission for at least two wireless devices in accordance with some embodiments of the disclosure.

FIG. 10 is a flow diagram of another process for determining whether to schedule two or more wireless devices 22 on the same one or more radio resources, i.e., a process for checking and/or determining spatial separability of wireless devices 22 for determining whether radio resources can be reused for two or more wireless devices 22. In one or more embodiments, the network node 16 such as via one or more of processing circuitry 68, processor 70 and radio interface 62 is configured to estimate (Block S158) STI. In one or more embodiments, an example of the estimated STI corresponds to an estimated angle of arrival (AoA), i.e., $A_k^{t,f} = (\theta_k^{t,f}, \phi_k^{t,f})$, where $\theta$ and $\phi$ indicate respectively the elevation and azimuth angles measured with respect to the AAS plane. In one or more embodiments, STI is estimated as described herein.

In one or more embodiments, the network node 16 such as via one or more of processing circuitry 68, processor 70 and radio interface 62 is configured to compute (Block S160) at least one parameter associated with and/or corresponding to spatial separability of two or more wireless devices 22. For example, the network node 16 computes parameter (c) where $c = \Pi_t f(A_k^{t,f}, A_i^{t,f})$. In one or more embodiments, the computation and/or determination of parameter (c) is based at least in part on the following: $\{A_i^{t,f}, \forall i; i \in S; i \neq k\}$.

In one or more embodiments, the network node 16 such as via one or more of processing circuitry 68, processor 70 and radio interface 62 is configured to determine (Block S162) whether at least one predefined criterion is met. For example, in one or more embodiments, the at least one predefined criterion is met if parameter c equals 1, else the at least one predefined criterion is not met. In one or more embodiments, the at least one predefined criterion being met indicates that the wireless devices 22 are spatially separable. The spatial separability helps guarantee that when simultaneous transmission on the same radio resources towards multiple wireless devices 22 is scheduled, the network node 16 should be able to precode or preprocess the transmission such that there is insignificant interference (i.e., at least one of the interference is below a threshold and/or meets a predefined criterion) between the transmissions directed towards different wireless devices 22.

In one or more embodiments, the network node 16 such as via one or more of processing circuitry 68, processor 70 and radio interface 62 is configured to schedule (and/or cause scheduling of) (Block S164) WD 22-$k$ and WD 22-$i$ on the same radio resources (t,f) if the determination is made that the at least one predefined criterion is met. For example, WD 22-$k$ and WD 22-$i$, $i \in S$; $i \neq k$ can be scheduled on the same radio resource(s) (t, f). In one or more embodiments, the network node 16 such as via one or more of processing circuitry 68, processor 70 and radio interface 62 is configured to not to schedule, i.e., omit scheduling of, (Block S166) WD 22-$k$ and WD 22-$i$ on the same radio resources (t,f) if the determination is made that the at least one predefined criterion is not met. For example, WD 22-$k$ and WD 22-$i$, $i \in S$; $i \neq k$ cannot be scheduled on the same radio resource(s) (t, f). While WD 22-$k$ and WD 22-$i$ are not scheduled on the same radio resources, in one or more embodiments, WD 22-$k$ and WD 22-$i$ may be scheduled on different radio resources.

Figure 11:
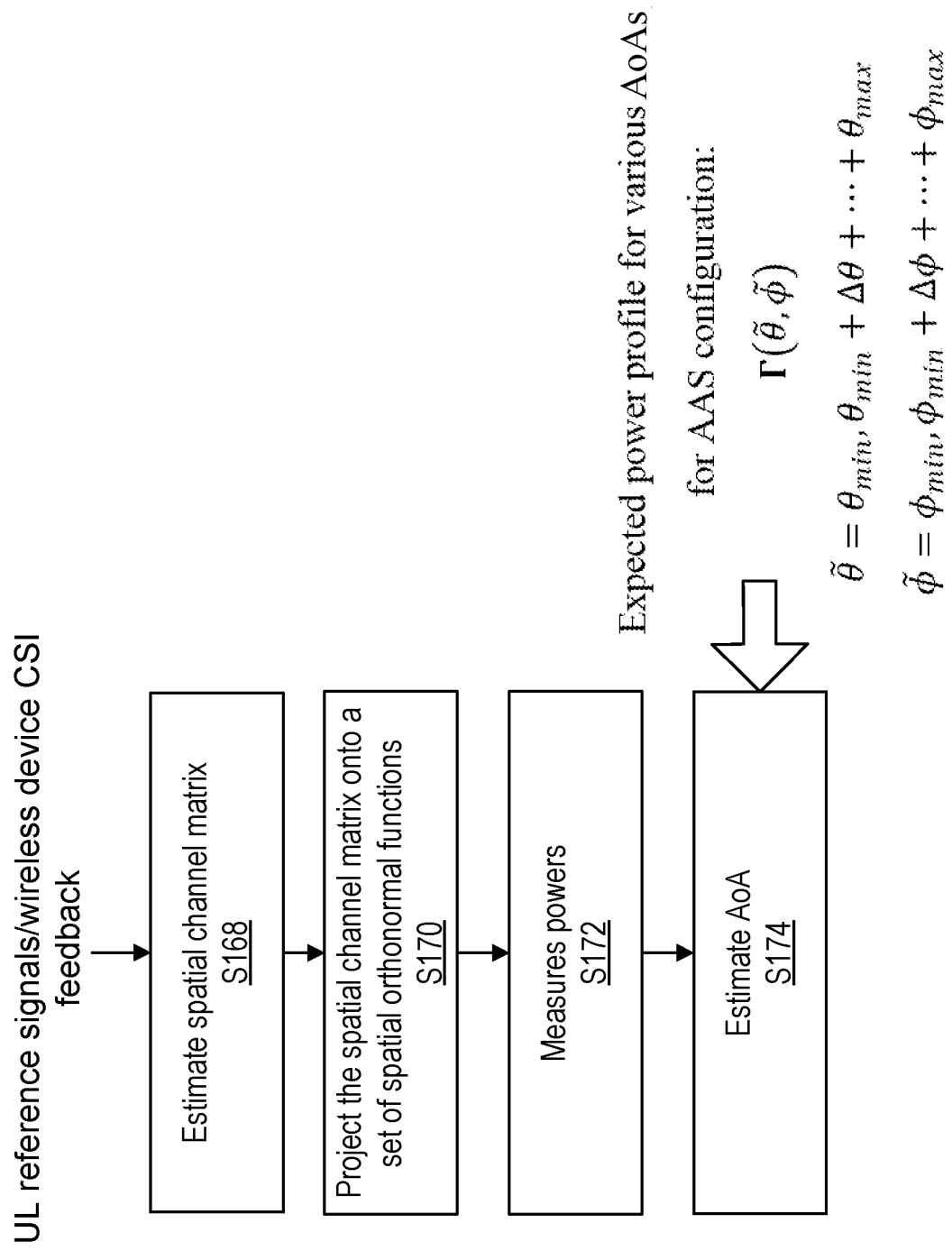
FIG. 11 is a flowchart of an exemplary process for angle of arrival estimation in accordance with some embodiments of the disclosure.

FIG. 11 is a flow diagram of an example process for estimating STI (e.g., AoA) according to one or more embodiments of the disclosure. In one or more embodiments, the network node 16 such as via one or more of processing circuitry 68, processor 70 and radio interface 62 is configured to schedule estimates (Block S168) the spatial channel matrix. For example, the UL channel, $H_{M \times N}^{t,f}$ is estimated from a received signal from the wireless device 22 at time t and frequency $f$, where M×N represents the AAS panel dimensions in antenna elements or ports.

In one or more embodiments, network node 16 such as via one or more of processing circuitry 68, processor 70 and radio interface 62 is configured to project, i.e., logical and/or mathematically project, (Block S170) the spatial channel matrix onto a set of spatial orthonormal functions, D, i.e., $<H_{M \times N}^{t,f}, D>$. That is, in one or more embodiments, the estimating of STI includes at least logically projecting received signals onto a set of spatial orthonormal functions.

In one or more embodiments, network node 16 such as via one or more of processing circuitry 68, processor 70 and radio interface 62 is configured to measure (Block S172)

powers, i.e., $P(\theta^{t,f},\phi^{t,f})=|<H_{M\times N},D>|^2$. That is, in one or more embodiments, the estimating of STI includes at least measuring powers of each spatial orthonormal function. In one or more embodiments, the network node 16 such as via one or more of processing circuitry 68, processor 70 and radio interface 62 is configured to estimate (Block S174) the AoA. In one or more embodiments, the AoA is estimated by measuring a distance between the measured power profile and the expected power profile:

$$\{\hat{\theta}^{t,f},\hat{\phi}^{t,f}\} = \min_{\{\tilde{\theta},\tilde{\phi}\}}|P(\theta^{t,f},\phi^{t,f})-\Gamma(\tilde{\theta},\tilde{\phi})|.$$

That is, in one or more embodiments, estimating of STI includes at least selecting an angle of arrival (AoA) corresponding to a lowest Euclidean distance between the measured powers and expected powers. The expected power profile for various AoAs for AAS configuration may be given by:

$r(\tilde{\theta},\tilde{\phi})$ $\tilde{\theta}=\theta_{min},\theta_{min}+\Delta\theta+\ldots+\theta_{max}$ and $\tilde{\phi}=\phi_{min},\phi_{min}+\Delta\phi+\ldots+\phi_{max}$.

In one or more embodiments, the measured powers of each orthonormal function are compared with expected values for each AoA. The AoA which corresponds to a lowest distance between the measured power levels and the expected power levels is selected as the AoA, i.e., as the most probable and/or likely AoA. The expected values are generated based on the AAS configuration (i.e., the electrical distance between the antenna elements of a network node 16, the width and length of AAS, etc.). $\Delta\theta$ and $\Delta\phi$ are determined based on the required accuracy of AoA and/or the AAS configuration, for example.

Figure 12:
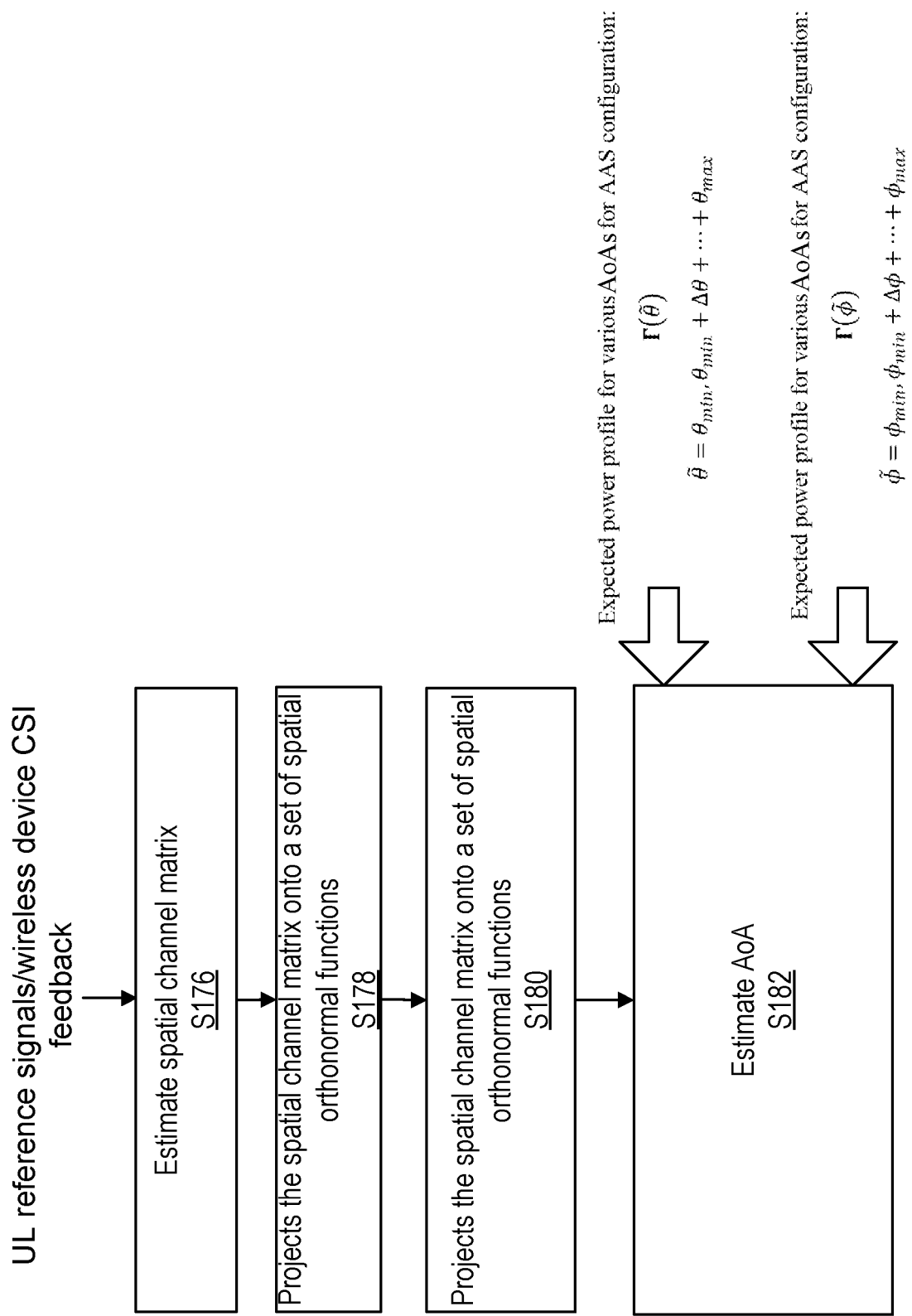
FIG. 12 is a flowchart of another exemplary process for angle of arrival estimation in accordance with some embodiments of the disclosure.

FIG. 12 is a flow diagram of another example process for estimating STI (e.g., AoA). In one or more embodiments, the network node 16 such as via one or more of processing circuitry 68, processor 70 and radio interface 62 is configured to estimate (Block S176) the spatial channel matrix (e.g., $H_{M\times N}$(subBand,WDRxAnt)). In one or more embodiments, the network node 16 such as via one or more of processing circuitry 68, processor 70 and radio interface 62 is configured to project (Block S178) the spatial channel matrix onto a set of Spatial-Orthonormal functions (e.g., $<H_{M\times N},D>$). In one or more embodiments, network node 16 such as via one or more of processing circuitry 68, processor 70 and radio interface 62 is configured to measure (Block S180) the powers. In one or more embodiments, the powers include:

$(\theta^{t,f})=\Sigma_{\phi^{t,f}}|<H_{M\times N},D>|^2$ and $P(\phi^{t,f})=\Sigma_{\theta^{t,f}}|<H_{M\times N},D>|^2$.

In one or more embodiments, the network node 16 such as via one or more of processing circuitry 68, processor 70 and radio interface 62 is configured to estimate (Block S182) the AoA. For example, in one or more embodiments, the AoA is estimated by measuring the distance between the measure power profile and the expected power profile:

$$\hat{\theta}^{t,f} = \min_{\tilde{\theta}}|P(\theta^{t,f})-\Gamma(\tilde{\theta})|.$$

In one or more embodiments, the expected power profile for various AoAs for AAS configuration is as follows:

$r(\tilde{\theta})$ $\tilde{\theta}=\theta_{min},\theta_{min}+\Delta\theta+\ldots+\theta_{max}$.

In the same or a different example, in one or more embodiments, the AoA is estimated by measuring a distance between the measure power profile and the expected power profile:

$$\hat{\phi}^{t,f} = \min_{\tilde{\phi}}|P(\phi^{t,f})-\Gamma(\tilde{\phi})|.$$

In one or more embodiments, the expected power profile for various AoAs for AAS configuration is as follows:

$r(\tilde{\phi})$ $\tilde{\phi}=\phi_{min},\phi_{min}+\Delta\phi+\ldots+\phi_{max}$.

Therefore, in one or more embodiments, the elevation and azimuth, i.e., $\theta$ and $\phi$, are estimated separately and/or independently.

Figure 13:
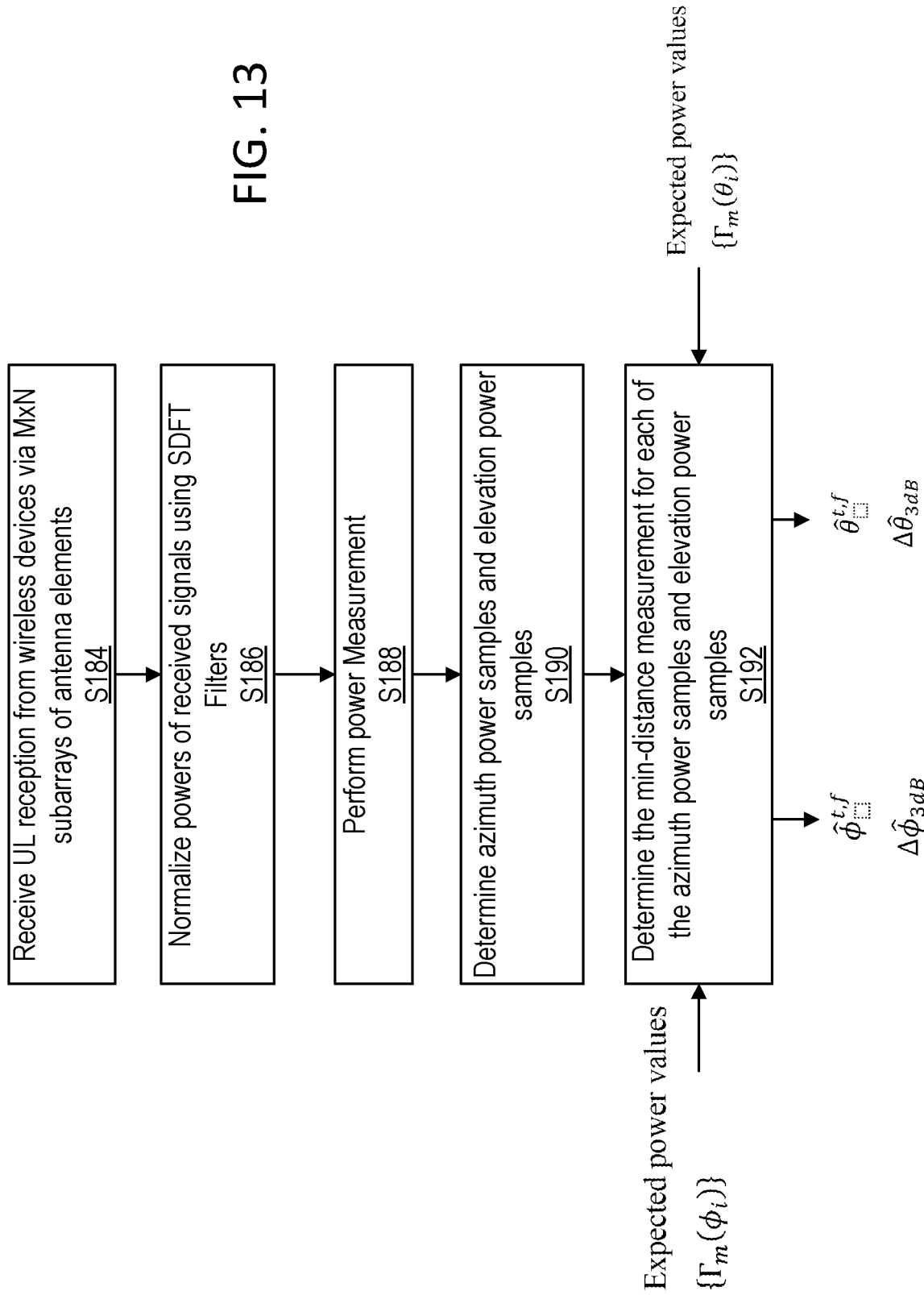
FIG. 13 is a flowchart of yet another exemplary process for angle of arrival estimation in accordance with some embodiments of the disclosure.

FIG. 13 is a flow diagram of another example process for estimating STI (e.g., AoA) such as by using SDFT filters. In one or more embodiments, network node 16 such as via one or more of processing circuitry 68, processor 70 and radio interface 62 is configured to receive (Block S184) uplink reception from two or more wireless devices 22 via M×N subarrays of antenna elements. In one or more embodiments, network node 16 such as via one or more of processing circuitry 68, processor 70 and radio interface 62 is configured to normalize (Block S186) the powers of the received signals using Spatial Discrete Fourier Transform (SDFT) filters. In one or more embodiments, the received signals are filtered using a set of spatial orthonormal functions. In one or more embodiments, the set of spatial orthonormal functions include a set of functions that are orthogonal to each other in a plurality of spatial dimensions where the plurality of spatial dimensions including at least one of distance, elevation and azimuth defined with respect to the location of a network node 16.

In one or more embodiments, the network node 16 such as via one or more of processing circuitry 68, processor 70 and radio interface 62 is configured to perform (Block S188) power measurement. For example, in one or more embodiments, the powers of each of the filtered signals are measured. In one or more embodiments, the network node 16 such as via one or more of processing circuitry 68, processor 70 and radio interface 62 is configured to determine (Block S190) azimuth power samples ($P_m(\phi_{AoA})$) and elevation power samples ($P_m(\theta_{AoA})$). In one or more embodiments, the network node 16 such as via one or more of processing circuitry 68, processor 70 and radio interface 62 is configured to determine (Block S192) the min-distance measurement for each of the azimuth power samples and elevation power samples. In one or more embodiments, the min-distance measurements are based at least in part expected power values $\{\Gamma_m(\theta_i)\}$ and/or expected power values $\{\Gamma_m(\phi_i)\}$. In one or more embodiments, the measured powers are compared with expected powers for an azimuth and elevation. In one or more embodiments, the min-distance measurements for the azimuth power samples is given by:

$\hat{\phi}^{t,f}$ $\Delta\hat{\phi}_{3\,dB}$

In one or more embodiments, the min-distance measurements for the elevation power samples is given by:

$$\hat{\theta}^{t,f}$$

$$\Delta\hat{\theta}_{3\,dB}$$

In particular, the powers values may be normalized before comparing with the expected powers values. For example, when there are M SDFT functions configured in Azimuth, the measured power from the mth function can be expressed as:

$$b_m(\psi) = \frac{1}{M} \frac{\sin^2(\pi M \eta)}{\sin^2(\pi \eta)}$$

where $\eta = (\mu + m/M)$
$\mu = d_\lambda \sin \psi$, $d_\lambda$ is the inter-element spacing normalized with respect to the wavelength
m is a non-integer value in the range [0, M−1]
SDFT filters can be oversampled for better performance.

The minimum distance measurement involves measuring the azimuth (elevation) power samples and comparing these samples with multiple sets of expected power samples. Each set corresponds to different azimuth (elevation) angle. As shown in FIG. 6, an estimate of beamwidth or AoA variation, $\theta_{3\,dB}$ and $\phi_{3\,dB}$ can also be estimated from the measured distances from Γ. In one or more embodiments, a determination is made whether the azimuth and elevation AoAs corresponds to the expected powers at a minimum Euclidean distance. As used herein, distance may refer to a Euclidean distance. In one or more of the above embodiments, AoA is estimated per time t and per frequency $f$. Due to computational complexity, the estimation of AoA can be limited to discrete values of t and $f$, based on the expected wireless device 22 mobility, which may in part depend on the deployment.

According one or more embodiments, an estimate of AoA can also be derived by measuring the weighted mean of the powers as follows:

$$\hat{\theta}^{t,f} = \Sigma_m \Theta(m) P_m / \Sigma_m P_m$$

where $\Theta(m)$ corresponds to the angle corresponding to mth orthogonal function. When STI is AoA with respect to one or more connected network nodes 16, then wireless device 22 can be paired by measuring the AoA separation between the wireless devices 22, i.e., $f(x, y)$ can be expressed as follows:

$$f(x, y) = \begin{cases} 1 & \text{when } |x - y| > \eta \\ 0 & \text{otherwise} \end{cases}$$

where η is dependent on the deployment scenario. For example, when the propagation environment is characterized by rich scattering, such as a downtown area during a peak period (i.e., peak communication traffic period), then the AoA separation can be very small, ~0.1 to 1 degree. η may also depend on the time of the day since the scattering is also dependent on the surrounding movements or motion of objects (e.g., person, vehicle, etc.). For suburban and rural areas, the AoA separation can be much larger to guarantee the spatial separability.

In one or more embodiments, the AoA is estimated in 3D space, where UL reception from 2D AASs from multiple network nodes 16 are used to determine the STI. The transmissions towards multiple wireless devices 22 are precoded across the AASs of multiple network nodes 16 such that there is no cross-transmission-interference or minimal cross-transmission-interference (i.e., cross-transmission-interference is below a predefined threshold).

In one or more embodiments, STI can be represented by the power spectrum of the estimated channel for a wireless device 22 after projection onto a set of spatial orthonormal functions, i.e., STI corresponds to a power spectrum of an estimated channel for each wireless device 22. For example, the STI at time t and frequency $f$ for WD 22-$k$, $A_k^{t,f}$ can be expressed as the collection of $\{\tilde{p}_k^{t,f}\}_k$ where $$A_k^{t,f} = \{\tilde{p}_\ell^{t,f} = |<H_{M \times N}^{t,f}, d_\ell>|^2\}_\ell$$

and $d_\ell$ is the $\ell^{th}$ basis function of the orthonormal basis D. The power spectrum can also be averaged or filtered over frequency and/or time to help improve the estimation process and reduce the effect of noisy channel estimates.

Since the power spectrum of the estimated channel provides detailed information on the spatial components of the channel, in the domain of the spatial orthonormal functions, the power spectrum can be used to measure the spatial separation of two wireless devices 22. Let $\tilde{p}_\ell^{t,f}(k)$ denote the $\ell^{th}$ component of the power spectrum of the $k^{th}$ wireless device 22 at time t and frequency $f$. The following two measures of the spatial separation between WD 22 $i$ and WD 22 $j$ that use the power spectrum of the estimated channel are proposed:

1—Power spectrum correlation: The correlation between the power spectrum of WD 22 $i$ and WD 22 $j$ can be computed as:

$$\rho_{k,j}^{t,f} = \sum_\ell \tilde{p}_\ell^{t,f}(k) \tilde{p}_\ell^{t,f}(j)$$

and the two wireless devices 22 are considered spatially separable if $\rho_{i,j}^{t,f} < \gamma_\rho$ (i.e., predefined criterion for determining spatial separability) where $\gamma_\rho$ is a predefined threshold on the power spectrum correlation, i.e., $$f(A_k^{t,f}, A_j^{t,f}) = \begin{cases} 1 & \text{when } \rho_{k,j}^{t,f} < \gamma_\rho \\ 0 & \text{Otherwise} \end{cases}$$

2—Reduced power spectrum overlap: For each wireless device 22, a reduced power spectrum is computed by keeping the significant components of the power spectrum and setting the remaining insignificant components to zero. Let $\zeta_k^{t,f}$ denote the set of significant power spectrum components of the $k^{th}$ wireless device 22 at time t and frequency $f$. The significant components can be chosen in several ways as described below with respect to a)-c).

a) Fixed number of components: In one example, a fixed number of components, $R_F$, that yield the maximum collected power $$\sum_{\ell \in \zeta_k^{t,f}} \tilde{p}_\ell^{t,f}(k)$$

are selected, i.e., the indices of $R_F$ largest $\tilde{p}_\ell^{t,f}$ are selected to form $\zeta_k^{t,f}$.

b) Collected power: In another example, the minimum number of components that have a total power greater than a fraction a of the total power in all components are chosen, i.e., the set of significant components is the solution to the following optimization problem
$\min |\zeta_k^{t,f}|$ s.t.

$$\sum\nolimits_{k \in \zeta_k^{t,f}} \tilde{p}_\ell^{t,f}(k) > \alpha \sum\nolimits_\ell \tilde{p}_\ell^{t,f}(k)$$

c) Threshold-based: Select the components that have a power greater than a threshold γ of the total power, i.e., $\zeta_k^{t,f}$ is formed by selecting $\ell$ such that $\tilde{p}_\ell^{t,f}(k)$ is greater than or equal to $\gamma \Sigma_\ell \tilde{p}_\ell^{t,f}(k)$ The reduced power spectrum overlap between WD 22-*k* and WD 22-*j* can be computed as $$f(A_k^{t,f}, A_j^{t,f}) = \begin{cases} 1 & \text{when } \sum\nolimits_\ell 1_{\ell \in \zeta_k^{t,f}} 1_{\ell \in \zeta_j^{t,f}} < \gamma_0 \\ 0 & \text{Otherwise} \end{cases}$$

where $1_x=1$ if x is true and $1_x=0$ else. The two wireless devices 22 are considered spatially separable if $f(A_k^{t,f}, A_j^{t,f}) < \gamma_o$ where $\gamma_o$ is a predefined threshold on the reduced power spectrum overlap. That is, in one or more embodiments, the determining of spatial separability includes reducing power spectrum components of the power spectrum of the estimated channel by selecting a subset of power spectrum components, and determining a spectrum overlap between the plurality of wireless devices 22 (e.g., WD 22-*k* and WD 22-*j*) based at least in part on the reduced power spectrum components.

A few example methods are provided as follows:

Example 1. A method at a communication network comprising;
estimating spatial transmission information (STI) from the UL reception from different wireless devices 22 at a group of antenna elements physically located at least one network node 16;
assessing the STI for spatial separability among the wireless device 22 transmissions; and
scheduling simultaneous transmissions towards the wireless devices 22 that are spatially separable by precoding the transmission from the at least one network node 16.

Example 2. The method of Example 1, wherein STI is AoA.

Example 3. The method of Example 1, where the estimating STI comprises:
filtering a received signal through a set of spatial orthonormal functions;
measuring powers of each of the filtered signals;
comparing powers with expected powers for a given azimuth and elevation; and
determining the azimuth and elevation arrival angles corresponding to the expected powers with the minimum distance.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above.

What is claimed is:

1. A network node, comprising:
   processing circuitry configured to:
   estimate spatial transmission information, STI, for each of a plurality of wireless devices serviced by a plurality of network nodes;
   determine spatial separability among the plurality of wireless devices based at least in part on the estimated STI for each of the plurality of wireless devices; and
   cause scheduling of the plurality of wireless devices on the same communication resources based at least in part on the determined spatial separability, the scheduling of the plurality of wireless devices on the same communication resources includes causing each of the plurality of network nodes to precode transmission on the same communication resources.

2. The network node of claim 1, wherein the STI corresponds to an angle of arrival, AoA, with respect to a connected network node.

3. The network node of claim 1, wherein the STI corresponds to a power spectrum of an estimated channel for each wireless device.

4. The network node of claim 1, wherein the estimating of STI includes:
   logically projecting received signals onto a set of spatial orthonormal functions;
   measuring powers of each spatial orthonormal function; and
   selecting an angle of arrival, AoA, corresponding to a lowest Euclidean distance between the measured powers and expected powers.

5. The network node of claim 1, wherein the estimating of STI includes:
   filtering received signals using a set of spatial orthonormal functions;
   measuring powers of each of the filtered signals;
   comparing the measured powers with expected powers for an azimuth and elevation; and
   determining whether the azimuth and elevation an angle of arrivals, AoAs, correspond to the expected powers at a minimum Euclidean distance.

6. The network node of claim 4, wherein the set of spatial orthonormal functions include a set of functions that are orthogonal to each other in a plurality of spatial dimensions, the plurality of spatial dimensions including at least one of distance, elevation and azimuth defined with respect to a location of a network node of the plurality of network nodes.

7. The network node of claim 6, wherein the determining of spatial separability includes:
   reducing power spectrum components of the power spectrum of an estimated channel by selecting a subset of power spectrum components; and
   determining a spectrum overlap between the plurality of wireless devices based at least in part on the reduced power spectrum components.

8. The network node of claim 1, wherein the network node includes transmitter and receiver functions towards a wireless device of the plurality of wireless devices.

9. The network node of claim 1, wherein the determining of spatial separability includes:
   selecting a wireless device of the plurality of wireless devices;
   comparing STI of the selected wireless device with STI of another wireless device of the plurality of wireless devices; and
   including both the selected wireless device and the another wireless device in a multiuser, MU, group if the comparison meets a criterion.

10. The network node of claim 1, wherein the determining of spatial separability includes:
    selecting a wireless device of the plurality of wireless devices;
    comparing STI of the selected wireless device with STIs of wireless devices of the plurality of wireless devices in a multiuser, MU, group; and
    including the selected wireless device in the MU group if the comparison passes a criterion.

11. The network node of claim 9, wherein the comparing of STI includes at least one of:
    computing a Euclidean distance between the STIs of any two wireless devices; and
    computing a correlation between the STIs of any two wireless devices.

12. The network node of claim 11, wherein the computing of the correlation includes computing the Euclidean distance between the any two STIs and subtracting sum of squares of each STI.

13. The network node of claim 9, wherein the criterion defines at least one rule configured to check if the comparison is one of:
    above a predetermined threshold; and
    below a predetermined threshold.

14. The network node of claim 1, wherein the scheduling corresponds to pairing the plurality of wireless devices for multi-user multiple-input multiple-output, MU-MIMO, pairing.

15. A method performed by a network node, the method comprising:
    estimating spatial transmission information, STI, for each of a plurality of wireless devices serviced by a plurality of network nodes;
    determining spatial separability among the plurality of wireless devices based at least in part on the estimated STI for each of the plurality of wireless devices; and
    causing scheduling of the plurality of wireless devices on the same communication resources based at least in part on the determined spatial separability, the scheduling of the plurality of wireless devices on the same communication resources includes causing each of the plurality of network nodes to precode transmission on the same communication resources.

16. The method of claim 15, wherein the STI corresponds to an angle of arrival, AoA, with respect to a connected network node.

17. The method of claim 15, wherein the STI corresponds to a power spectrum of an estimated channel for each wireless device.

18. The method of claim 15, wherein the estimating of STI includes:
logically projecting received signals onto a set of spatial orthonormal functions;
measuring powers of each spatial orthonormal function; and
selecting an angle of arrival, AoA, corresponding to a lowest Euclidean distance between the measured powers and expected powers.

19. The method of claim 15, wherein the estimating of STI includes:
filtering received signals using a set of spatial orthonormal functions;
measuring powers of each of the filtered signals;
comparing the measured powers with expected powers for an azimuth and elevation; and
determining whether the azimuth and elevation an angle of arrivals, AoAs, correspond to the expected powers at a minimum Euclidean distance.

20. The method of claim 18, wherein the set of spatial orthonormal functions include a set of functions that are orthogonal to each other in a plurality of spatial dimensions, the plurality of spatial dimensions including at least one of distance, elevation and azimuth defined with respect to the location of a network node.

21. The method of claim 20, wherein the determining of spatial separability includes:
reducing power spectrum components of the power spectrum of an estimated channel by selecting a subset of power spectrum components; and
determining a spectrum overlap between the plurality of wireless devices based at least in part on the reduced power spectrum components.

22. The method of claim 15, wherein the network node includes transmitter and receiver functions towards a wireless device of the plurality of wireless devices.

23. The method of claim 15, wherein the determining of spatial separability includes:
selecting a wireless device of the plurality of wireless devices;
comparing STI of the selected wireless device with STI of another wireless device of the plurality of wireless devices; and
including both the selected wireless device and the another wireless device in a multiuser, MU, group if the comparison meets a criterion.

24. The method of claim 15, wherein the determining of spatial separability includes:
selecting a wireless device of the plurality of wireless devices;
comparing STI of the selected wireless device with STIs of wireless devices of the plurality of wireless devices in a multiuser, MU, group; and
including the selected wireless device in the MU group if the comparison passes a criterion.

25. The method of claim 23, wherein the comparing of STI includes at least one of:
computing a Euclidean distance between the STIs of any two wireless devices; and
computing a correlation between the STIs of any two wireless devices.

26. The method of claim 25, wherein the computing of the correlation includes computing the Euclidean distance between the any two STIs and subtracting sum of squares of each STI.

27. The method of claim 23, wherein the criterion defines at least one rule configured to check if the comparison is one of:
above a predetermined threshold; and
below a predetermined threshold.

28. The method of claim 17, wherein the scheduling corresponds to pairing the plurality of wireless devices for multi-user multiple-input multiple-output, MU-MIMO, pairing.

29. A network node, comprising:
processing circuitry configured to:
estimate spatial transmission information, STI, for each of a plurality of wireless devices serviced by a plurality of network nodes based at least in part on uplink reception from each of the plurality of wireless devices, the estimated STI corresponding to an angle of arrival, AoA, with respect to a connected network node;
determine spatial separability among the plurality of wireless devices based at least in part on the estimated STI for each of the plurality of wireless devices; and
cause scheduling of the plurality of wireless devices on the same communication resources for multiuser multiple-input multiple-output, MU-MIMO, based at least in part on the determined spatial separability, the scheduling of the plurality of wireless devices on the same communication resources includes causing each of the plurality of network nodes to precode transmission on the same communication resources.

* * * * *